United States Patent [19]

Nishida et al.

[11] Patent Number: 5,069,530
[45] Date of Patent: Dec. 3, 1991

[54] SOLID STATE IMAGE PICK-UP APPARATUS

[75] Inventors: Yasuaki Nishida; Yoshihiro Fujita; Yoshiki Iino; Norihiko Kawada, all of Tokyo, Japan

[73] Assignees: Nippon Hoso Kyokai; Ikegami Tsushinki Co., Ltd., both of Tokyo, Japan

[21] Appl. No.: 483,211

[22] Filed: Feb. 20, 1990

[30] Foreign Application Priority Data

Feb. 21, 1989 [JP] Japan ................................ 1-39260

[51] Int. Cl.⁵ .................... H04N 9/04; H04N 9/097; G02B 5/20; G02B 27/28
[52] U.S. Cl. .................................... 359/498; 358/50; 359/885
[58] Field of Search ................... 358/50; 350/311, 313, 350/317, 404

[56] References Cited

U.S. PATENT DOCUMENTS 4,761,682 8/1988 Asaida ................................. 358/50

FOREIGN PATENT DOCUMENTS 60-164719 8/1985 Japan .
2-13086 1/1990 Japan .

Primary Examiner—Ian J. Lobo
Attorney, Agent, or Firm—Spencer & Frank

[57] ABSTRACT

An apparatus for picking-up an optical image of object including a lens system for forming the optical image of object, an optical filter for suppressing moire fringes, a color separation system for separating the optical image into green, red and blue color images, and three solid state image sensors for receiving the green, red and blue color images, respectively. The optical filter having a first quartz plate for separating ordinary and extraordinary light rays from each other in a direction of +45° with respect to the horizontal direction, a second quartz plate for separating ordinary and extraordinary light rays from each other in the horizontal scanning direction, and a third quartz plate for separating ordinary and extraordinary light rays from each other in a direction of −45° with respect to the horizontal scanning direction. The optical filter has two trap points, one at a sampling frequency $f_s$ and the other near $1.5f_s$, but does not have a trap point wiithin a frequency range below $f_s$, so that components near $f_s$ as well as at $2f_s$, $3f_s$, $4f_s$ and $5f_s$ can be suppressed to a large extent, while the suppression for components in the base band can be limited effectively.

7 Claims, 4 Drawing Sheets

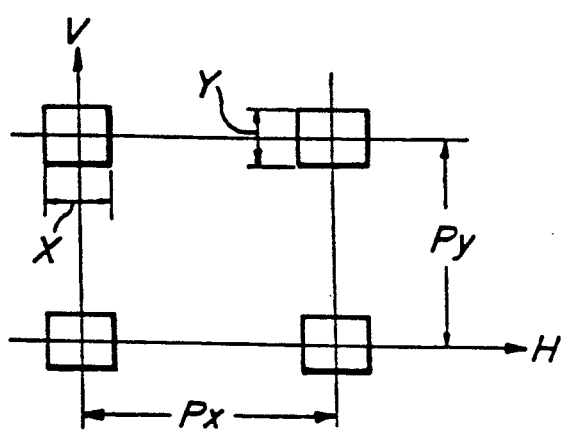
FIG_1
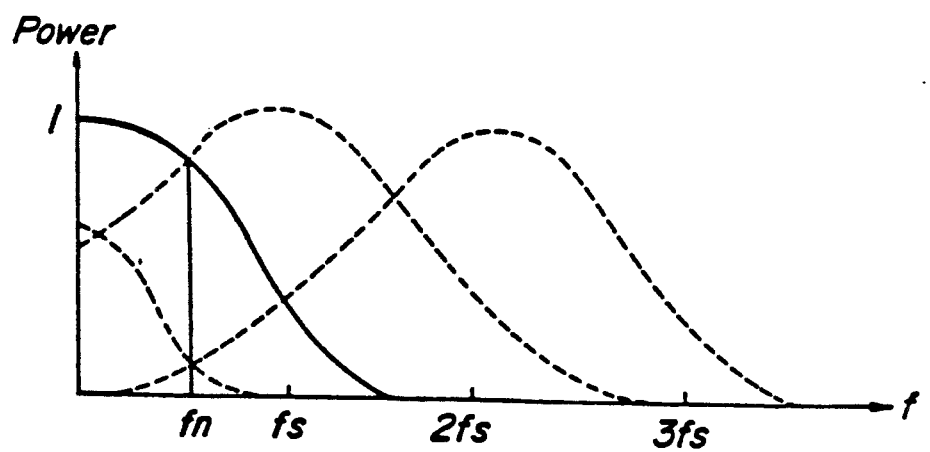
FIG_2

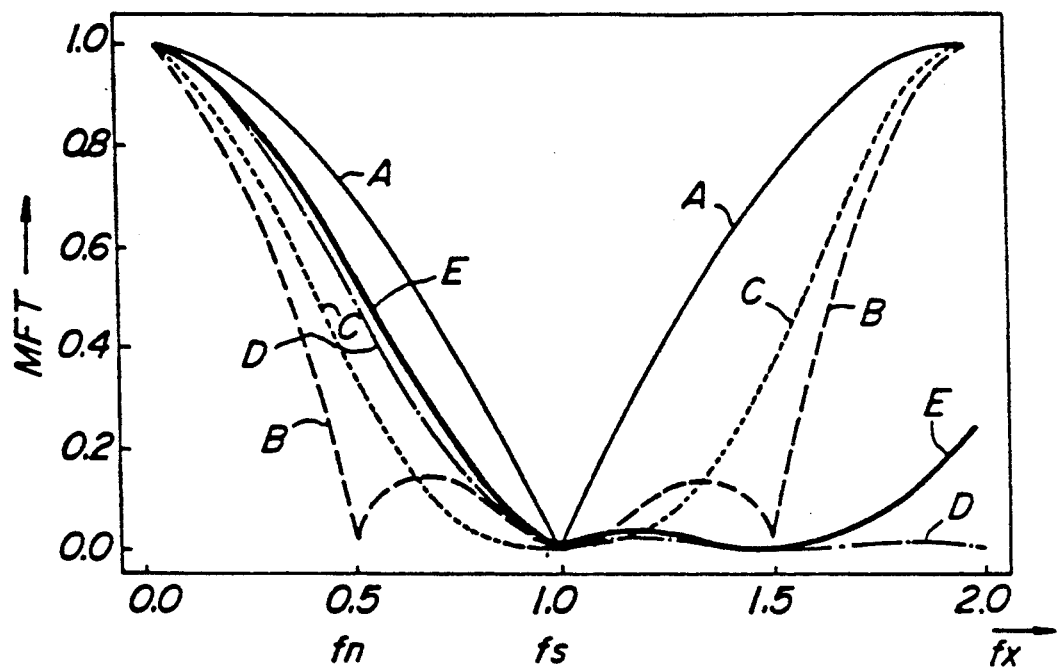
FIG_3
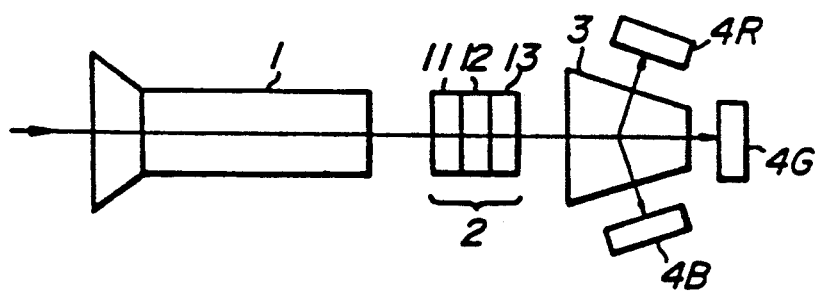
FIG_4

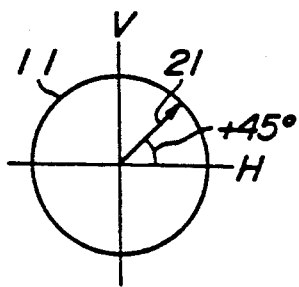 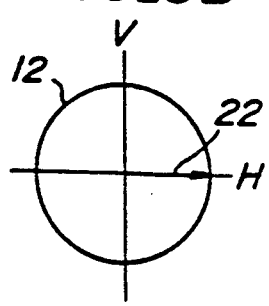 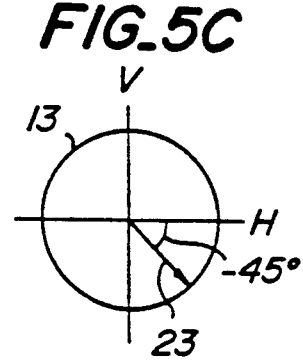
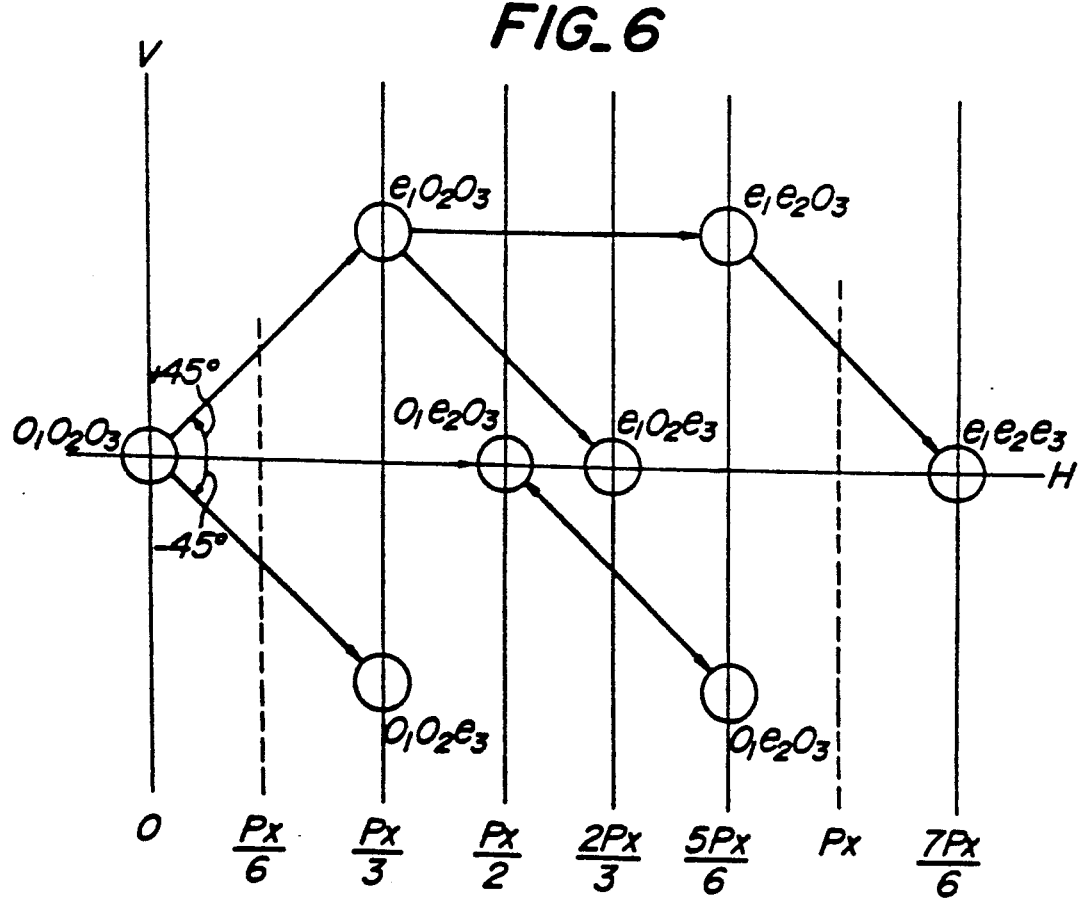

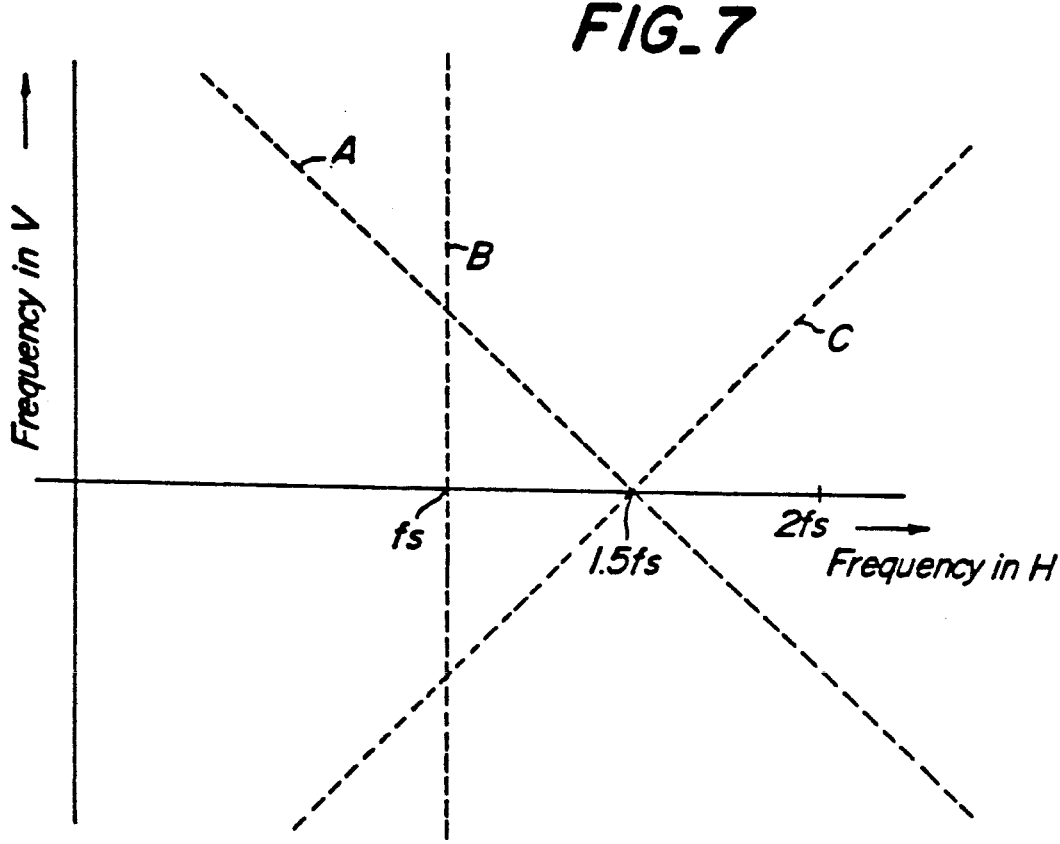
FIG_7
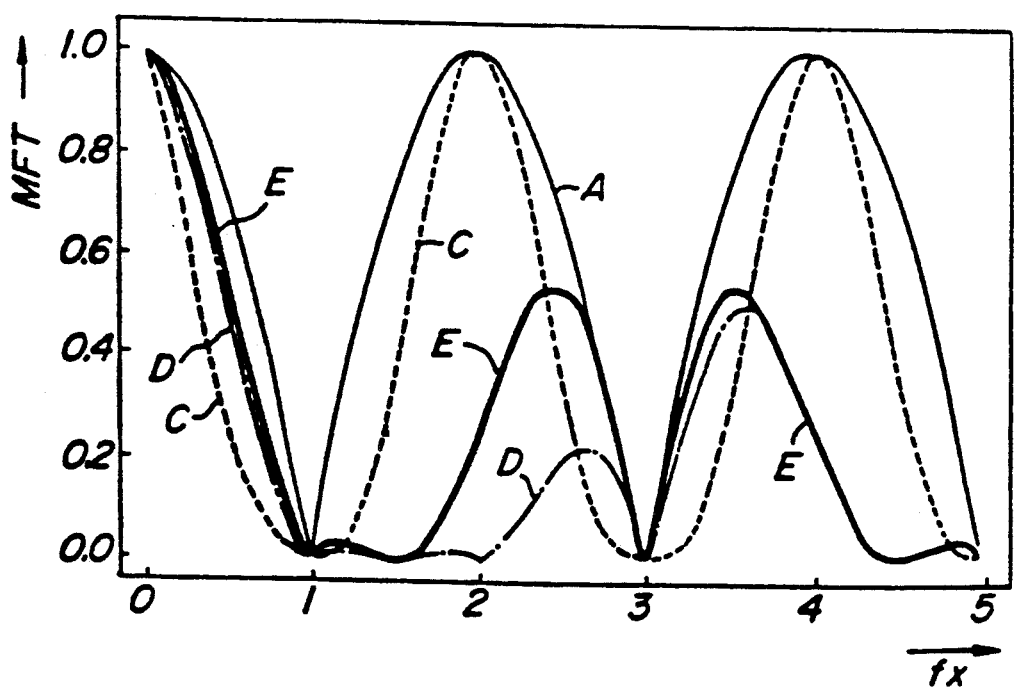
FIG_8

SOLID STATE IMAGE PICK-UP APPARATUS

BACKGROUND OF THE INVENTION

Field of the Invention and Related Art Statement

The present invention relates to a solid state image pick-up apparatus comprising at least one solid state image sensor having a number of light receiving elements arranged in matrix in main- and sub-scanning directions and an optical filter arranged in an incident light path to the solid state image sensor for separating ordinary and extraordinary light rays at least in the main-scanning direction, and more particularly to a solid state image pick-up apparatus in which moire fringes generated near a sampling frequency i.e. a spatial sampling frequency of the solid state image sensor as well as moire fringes generated at frequencies higher than twice the sampling frequency can be effectively removed, so that cross modulation between the moire fringes and an image signal can be also suppressed in an efficient manner.

FIG. 1 shows the distribution of the light receiving apertures of a widely used solid state image sensor. In FIGS. 1, H represents a horizontal direction corresponding to the main-scanning direction, V a vertical direction corresponding to the sub-scanning direction, X a dimension of a pixel aperture in the horizontal direction and Y denotes a dimension of a pixel aperture in the vertical direction. Further, $P_x$ expresses a pixel distance between successive pixels arranged in the horizontal direction H and $P_y$ represents a pixel distance between successive pixels aligned in the vertical direction H.

An optical image impinging upon the solid state image sensor is spatially sampled by the above mentioned aperture pattern at a sampling frequency $f_s$. Upon the image sampling, when the maximum spatial frequency $f_{max}$ contained in the image is higher than the Nyquist frequency $f_n$ which is equal to a half of the sampling frequency $f_s$, repetitive spectrum patterns are superimposed on each other as illustrated in FIG. 2. Generally the spatial frequency of the image of an object to be picked-up is limited by an optical lens system provided in the image pick-up apparatus. However, although incident image information having frequencies lower than $f_n$ can be restored from the image signal obtained by the spatial sampling, image information having frequencies f higher than the Nyquist frequency $f_n$ can not be recovered and is converted into components having difference frequencies ($f' = f_s - f$) from the sampling frequency $f_s$. These components having the difference frequencies are folded back into a frequency region lower than the Nyquist frequency $f_n$. These components generate pseudo signals termed folded back distortion. When an image is reproduced by an image signal containing a lot of the folded back distortions, there are produced moire fringes in a region of higher spatial frequencies and the image quality is deteriorated to a large extent.

Moreover, in the usual solid state image sensor, the width X of the pixel aperture measured in the horizontal direction H is smaller than the space ($P_x - X$) between successive pixels arranged in the horizontal direction as shown in FIG. 1, so that the above mentioned folded back distortion is liable to be increased.

In order to avoid deterioration in quality of the reproduced image due to the folded back distortion, it is necessary to suppress abruptly spatial frequency components higher than $f_n$ without decreasing the response in the frequency range lower than $f_n$. To this end, it has been well known to transmit the optical image of an object through an optical low pass filter having a trap frequency near $f_s$ before sampling the object image. In general, the optical low pass filter is formed by one or more birefringent quartz plates. A single quartz plate has a response characteristic which resembles a cosine curve shown by a thin solid line A in FIG. 3. In FIG. 3 the horizontal axis represents a frequency $f_x$ normalized by the sampling frequency $f_s$. When a single quartz plate is used, although the low frequency components, i.e. the base band components are not suppressed greatly, the above mentioned folded back distortion can not be removed, because the decay near the sampling frequency $f_s$ is still small and thus the decrease in the image quality can not be compensated for sufficiently.

In order to avoid the above explained drawbacks, various kinds of optical filters having a plurality of birefringent quartz plates have been proposed in, for instance, Japanese Patent Laid-open publications Nos. Kokai Sho 60-164719, 61-270985 and 61-270986. In known optical filters disclosed in these references, three birefringent quartz plates are arranged to separate ordinary and extraordinary light rays from each other in directions of $+45°$, $0°$ and $-45°$, respectively with respect to the horizontal scanning direction.

In the first reference, i.e. Japanese Patent Laid-open Publication No. 60-164719, there is described an optical filter for use in combination with a solid state image sensor having one chip image sensing device and a mosaic filter applied thereon. In this known optical filter, the separation width of first and third quartz plates is set to $$\frac{\sqrt{2}}{2} P_x$$

and that of a second quartz plate is set to $P_x$. Then the response curve may be expressed by a broken line B in FIG. 3 and has two trap points at $f_n$ and $f_s$. Such an optical filter has a larger suppressing function for frequency ranges near $f_n$ and $f_s$ than the single quartz plate, but the suppression near $f_s$ is not large enough from a practical view point and the suppression in the base band is too large so that desired image components are also reduced and the image quality is deteriorated.

In the above mentioned Japanese Patent Laid-open Publication No. 61-270986, there is disclosed an optical filter for use in a solid state image pick-up apparatus in which the input image is first separated into red, green and blue color images and these color images are received by three separate solid state image sensors, the positions of the apertures of the image sensing elements for receiving the green image being shifted by a half of the distance between successive pixels with respect to those of the image sensing elements for receiving the red and blue images. In such a solid state image sensor, the sampling frequency for the brightness signal is apparently increased twice. This method is usually termed the pixel shift method. In the known optical filter for use in such solid state image pick-up apparatus, first and third quartz plates have separation directions of $\pm 45°$ with respect to the horizontal direction and have a separation width of $$\frac{\sqrt{2}}{2} P_x,$$

and a second quartz plate operates to separate ordinary and extraordinary rays from each other in the horizontal direction by a separation width of $P_x$. In this known optical filter, the separation distance viewed in the horizontal direction is equal to $P_x$ as in the case of the above mentioned known optical filter described in Japanese Patent Laid-open Publication No. 60-164719. Therefore, sufficient suppression near the sampling frequency $f_s$ could not be obtained and further the base band is suppressed by a relatively large amount.

In the Japanese Patent Laid-open Publication No. 61-270985, there is also described a known optical filter for use in the solid state image pick-up apparatus to which the above explained pixel shift is also applied, said optical low pass filter including first and third quartz plates for separating ordinary and extraordinary light rays from each other in directions which make angles of $\pm 45°$, respectively with respect to the horizontal direction by the separation width of $2P_x$, and a second quartz plate for separating ordinary and extraordinary light rays from each other in the horizontal direction by a separation width equal to $\frac{1}{2}P_x$. In such a known optical filter, the trapping function at $f_n$ is improved more or less compared with the above mentioned known optical filters, but the suppression effect near $f_s$ is not so large and the base band is still suppressed too much.

In the known optical filters using three quartz plates so far explained, the filters are designed under the common conception that the amount of suppression in the frequency range higher than $f_n$ is increased by forming the trap points at $f_n$ and $f_s$. However, such a known designing conception could not yield sufficiently large suppression near $f_s$ and deterioration of the image quality due to moire fringes could not be compensated for sufficiently. Further, the low frequency components are reduced to an undesired extent so that the resolution of the reproduced image is decreased. Particularly, for solid state image pick-up apparatus using the pixel shift method, although the sampling frequency for the brightness signal can be apparently increased twice, when the object includes a black and white pattern having frequency components near the sampling frequency, a so-called color moire is introduced and the reproduced image is colored in an undesired manner. For instance, when a white portion of the black and white pattern is made incident upon the green pixel and a black portion is made incident upon red and blue pixels, the black and white pattern is reproduced as a green pattern. The known optical filter could not remove such color moire fringes sufficiently.

The inventors of the present application have proposed, in Japanese Patent Application No. 63-160849, corresponding to Japanese Laid-open Publications 60-164719 and 2-13086 an optical filter in which components near the sampling frequency are sufficiently suppressed to avoid effectively the generation of moire fringes and decrease in the resolution is avoided by making the suppression in the base band as small as possible. Such an optical filter is particularly suitable for sufficiently suppressing the above mentioned color moire fringes in a solid state image pick-up apparatus adopting the pixel shift. This optical filter comprises three quartz plates for separating ordinary and extraordinary light rays in the incident light at least in the main-scanning direction such that the total response characteristic in the main-scanning direction has one trap point at or near the sampling frequency, but has no trap point in the frequency range below the sample frequency.

As explained above, in the known optical filter comprising a plurality of quartz plates, the design conception is based on the fact that the decay in the frequency range above $f_s$ is increased by producing a large number of trap points, but in the above mentioned optical filter developed by the inventors of the present application only one trap point is produced even though a plurality of quartz plates are used. That is to say, in the latter optical filter, three quartz plates are arranged such that the direction for separating the ordinary and extraordinary light rays from each other is set to $\pm 45°$ and $0°$ so that the separation widths viewed in the main-scanning direction of all the quartz plates are made equal to $\frac{1}{2}P_x$. That is to say, first and third quartz plates are so formed that the separating direction is set to $\pm 45°$ and the separation widths are $$\frac{\sqrt{2}}{2} P_x,$$

and a second quartz plate is arranged such that the separation direction is set at $0°$ and the separation width is set to $\frac{1}{2}P_x$. By arranging the three quartz plates in the manner explained above, it is possible to obtain only one trap point at the sampling frequency and the components near the sampling frequency can be suppressed greatly and the undesired decay in the base band can be decreased.

It has been confirmed that the optical filter described in the above mentioned Japanese Patent Application No. 63-160849 has no function to suppress moire fringes producing at higher harmonics of the sampling frequency $f_s$, i.e. $2f_s$, $3f_s$, $4f_s$, $5f_s$ as shown by a dotted line C in FIG. 3. In order to reduce such moire fringes it is necessary to arrange one additional quartz plate, so that the whole construction of the optical filter might be complicated and large and the cost of the optical filter is increased. A chain line D in FIG. 3 shows the response characteristic of such an optical filter having the additional quartz plate. The above mentioned moire fringes at higher harmonics of the sampling frequency are often generated in dot-printed matters.

SUMMARY OF THE INVENTION

The present invention has for its object to provide a novel and useful solid state image pick-up apparatus in which the large suppression near the sampling frequency and a small suppression in the base band can be simultaneously attained, and at same time undesired moire fringes produced at second to fifth higher harmonics of the sampling frequency can be effectively reduced without increasing the number of quartz plates, so that the optical filter can be made simple in construction, small in size and inexpensive.

According to the invention, a solid state image pick-up apparatus comprises
image sensing means including at least one solid state image sensor having a number of light receiving elements arranged in matrix in main- and sub-scanning directions which are perpendicular to each other;

an optical image forming means for forming an optical image of an object to be picked-up and making said optical image incident upon said solid state image sensor; and optical filtering means including at least one optical filter having at least three quartz plates which are formed to have a total response property of the optical filter such that trap points are formed at a sampling frequency and near a frequency equal to one and a half of the sampling frequency, no trap point is formed in a frequency range below the sampling frequency, and at the trap point near the frequency equal to one and a half of the sample frequency two trap lines are crossed with each other at right angles.

In the known optical filter, the design conception is based on fact that the suppression in a frequency range above the Nyquist frequency $f_n$ is made large by increasing number of the trap points. The present invention does not adopt such a design conception, but is based on the recognition that the moire fringes generated at higher harmonics of the sampling frequency $f_s$ can be effectively removed by arranging at least three quartz plates such that there are obtained two trap points at the sampling frequency $f_s$ and near $1.5 f_s$, respectively.

In a preferred embodiment of the solid state image pick-up apparatus according to the invention, said optical filter comprises a first quartz plate for separating ordinary and extraordinary light rays from each other in a direction which makes an angle of +45° with respect to the main-scanning direction, a second quartz plate for separating the ordinary and extraordinary light rays from each other in a direction substantially parallel with the main-scanning direction, and a third quartz plate for separating the ordinary and extraordinary light rays from each other in a direction which makes an angle of −45° with respect to the main-scanning direction, wherein said second quartz plate is arranged between the first and third quartz plates, the separation width of the first and third quartz plates viewed in the main-scanning direction is set to a third of a pixel distance between successive pixels of the solid state image sensor arranged in the main-scanning direction and the separation width of the second quartz plate viewed in the main-scanning direction is set to a half of said pixel distance. That is to say, the separation width of the first and third quartz plates is set to $\frac{1}{3}P_x$, and that of the second quartz plate is set to $\frac{1}{2}Px$. Then, there can be obtained a response characteristic having only one trap point at the sampling frequency, so that sufficiently large suppression near the sampling frequency can be attained and decay for the base band can be limited, while moire fringes generating at higher harmonics up to the fifth harmonic of the sampling frequency can be effectively removed.

BRIEF DESCRIPTION OF THE DRAWINGS

FIG. 1 is a schematic view showing the aperture distribution of the solid state image sensor;

FIG. 2 is a graph illustrating the spectrum distribution of the image signal;

FIG. 3 is a graph representing the response characteristics of the optical filters;

FIG. 4 is a schematic view showing the whole construction of an embodiment of the solid state image pick-up apparatus according to the invention;

FIGS. 5A, 5B and 5C are schematic views depicting the optical property of the quartz plates of the optical filter shown in FIG. 4;

FIG. 6 is a diagram representing the separation property of the optical filter;

FIG. 7 is a diagram showing the trap property of the optical filter; and

FIG. 8 is a graph showing the wide range response characteristics of the known optical filter and the novel optical filter according to the invention.

DESCRIPTION OF THE PREFERRED EMBODIMENT

FIG. 4 is a schematic view showing an embodiment of the solid state image pick-up apparatus according to the invention. An image of an object to be picked-up is formed by an optical lens system 1 and the image is made incident upon three solid state image sensors 4R, 4G and 4B by means of an optical filter 2 and a color separation system 3. The color separation system 3 serves to separate the image of the object into red, green and blue color images directed in different directions and the solid state image sensors 4R, 4G and 4B are arranged such that the separated three color images are made incident upon the solid state image sensors, respectively. In the present embodiment, the so-called pixel shift is adopted, so that pixels of the solid state image sensors 4R and 4B for receiving red and blue images are situated at middle points between successive pixels of the solid state image sensor 4G for receiving the green color image. In this manner, the apparent sampling frequency for the brightness signal can be made twice the sampling frequency.

The optical filter 2 comprises three quartz plates 11, 12 and 13 which are stacked one upon the other. As illustrated in FIGS. 5A, 5B and 5C, major planes including the principal axis (direction into which ordinary and extraordinary light rays are separated from each other) and the optical axis of these quartz plates 11, 12 and 13 are set to +45°, 0° and −45°, respectively with respect to the main-scanning direction, i.e. the horizontal direction. It should be noted that it is not always necessary to arranged the quartz plates such that the principal axes of the quartz plates are set perpendicularly to the optical axis, but may be inclined at any desired angle. According to the present invention, the horizontal components of the separation widths of the first to third quartz plates 11 to 13 are made equal to a third of the pixel distance $P_x$. Since the major planes of the first and third quartz plates 11 and 13 are inclined by ±45°, respectively with respect to the horizontal direction H, the separation widths of these quartz plates are set to $$\frac{\sqrt{2}}{3} P_x.$$

The major plane of the second quartz plate 12 is coincident with the horizontal direction H, and the separation width is set to $\frac{1}{3}P_x$. It should be noted that these separation widths can be obtained by suitably selecting the thickness and composition of the quartz plates.

When the light bearing the object image is transmitted through the optical filter 2, the incident light is separated into eight light rays as depicted in FIG. 6. The intensities of these light rays are equal to each other. When the incident light is made incident upon the first quartz plate 11, there are obtained an ordinary light ray $o_1$ having an intensity equal to a half of that of the incident light and an extraordinary light ray directed in a direction which makes an angle of +45° with respect to the direction of the ordinary light ray and is separated therefrom by a width which is determined by the thickness of the first quartz plate 11. The ordinary and extraordinary light rays $o_1$ and $e_1$ thus separated are made incident upon the second quartz plate 12. From the second quartz plate 12 there are obtained ordinary and extraordinary light rays $o_2$ and $e_2$ from each of the incident light rays $o_1$ and $e_1$, the extraordinary light ray $e_2$ being separated from the ordinary light ray $o_2$ by a width corresponding to the thickness of the second quartz plate 12 viewed in the horizontal direction H. In this manner, there are obtained four light rays from the second quartz plate 12. Then, the ordinary and extraordinary light rays $o_2$ and $e_2$ are made incident upon the third quartz plate 13. From each of the incident light rays, there are produced ordinary and extraordinary light rays $o_3$ and $e_3$, respectively, the extraordinary light ray being separated from the ordinary light ray in a direction of −45° with respect to the ordinary light ray by a width corresponding to the thickness of the third quartz plate 13. In this manner there are obtained eight light rays which are separated from each other as shown in FIG. 6, the intensities of these eight light rays are identical with each other and are equal to an eighth of the intensity of the incident light.

As explained above, the horizontal components of the separation widths of the first and third quartz plates 11 and 13 are set to be identical with each other and are made equal to $\frac{1}{6}P_x$ and the separation width of the second quartz plate 12 is set to $\frac{1}{2}P_x$, so that there are obtained the following eight light rays emanating from the optical filter 2:

ordinary light rays $o_1$, $o_2$ and $o_3$ obtained at the incident position;

$e_1o_2o_3$ and $o_1o_2e_3$ appearing at positions separated from the incident point by the distance in the H direction equal to the separation width $\frac{1}{6}P_x$;

$e_1o_2e_3$ appearing at the position separated by $\frac{1}{3}P_x$;

$e_1e_2o_3$ and $o_1e_2o_3$ appearing at positions separated by $$\frac{5}{6} P_x;$$

and $e_1e_2e_3$ appearing at a position separated from the incident position by the width of $$\frac{7}{6} P_x.$$

Then, the response characteristic of the optical filter 2 may be expressed by the following normalized equation.

$$MTF(f_x) = \frac{1}{8}\left\{ 2\cos\left(2\pi \cdot f_x \cdot \frac{1}{12} P_x\right) + 4\cos\left(2\pi \cdot f_x \cdot \frac{1}{4} P_x\right) + 2\cos\left(2\pi \cdot f_x \cdot \frac{7}{12} P_x\right) \right\}$$

This response characteristic curve is shown by a thick solid line E in FIG. 3 and has a trap point at the sampling frequency $f_s$ and has no trap point in a frequency range lower than $f_s$. It should be noted that the optical filter according to the invention has one or more trap points in a frequency range higher than $f_s$. As illustrated in FIG. 7, the optical filter of the present embodiment has three trap lines A, B and C and the two trap lines B and C having positive and negative inclinations are crossed with each other at a frequency which is substantially equal to one and half of the sampling frequency $f_s$ of the solid state image sensor. FIG. 8 is a graph showing the wide range response characteristics of the optical filter according to the present invention and the known optical filters. Curves A, C and D correspond to the curves A, C and D of the known optical filter shown in FIG. 3, and a curve E represents the response characteristic of the optical filter according to the invention. As can be understood from a comparison between the known optical filter shown by the curve B shown in FIG. 3 and the novel optical filter according to the invention illustrated by the curve E, according to the invention it is possible to attain a large suppression near the sampling frequency $f_s$ to effectively avoid the occurrence of interference due to moire fringes. In particular the color moire fringes can be removed to a large extent. Further the amount of suppression within the base band lower than the Nyquist frequency $f_n$ can be made very small, so that the resolution can be improved materially. Moreover, the moire fringes generating in the frequency range up to the fifth harmonic of $f_s$ can be effectively suppressed. In the known design conception, there are produced the trap points at $f_s$ and $f_n$, so that the response curve is liable to raise near $f_s$ and the base band components near $f_n$ is suppressed too much. According to the present invention, the trap points are generated at $f_s$ and $1.5f_s$, and thus the above mentioned undesired phenomena of the known optical filter can be mitigated.

The present invention is not limited to the embodiment explained above, but may be modified in various ways. For instance, in the solid state image sensor in which the aperture width X is smaller than $\frac{1}{2}P_x$ as shown in FIG. 1, there is produced pseudo signal at $2f_s$. Then, a fourth quartz plate may be provided in front of the first quartz plate or behind the third quartz plate, said fourth quartz plate having the separation angle of 0° with respect to the horizontal direction and the separation width of $\frac{1}{4}P_x$. Then, the response curve of the optical filter may be represented by a chain line D in FIG. 8 and has such function that the base band is not excessively suppressed and the sufficient suppression is performed at $2f_s$.

In the above embodiment, it has been explained that the suppression is performed in the horizontal scanning direction. However when $P_x$ is substantially equal to $P_y$, suppression in the vertical direction can be also performed. However, if the difference between $P_x$ and $P_y$ is large, it may be effective to arrange an additional quartz plate for separating the light in the vertical direction. In such a case, the quartz plates have to be arranged to have separating directions which are different from those of adjacent plates by ±45°. In the above explained embodiment, the separating directions of the first and third quartz plates are set to ±45° and that of the second quartz plate is set to 0° with respect to the horizontal direction, but these angles do not have to be determined precisely and may deviate from these values. In such a case, the trap point in the response characteristic does coincide exactly with the sampling frequency. Further the first and third quartz plates may be exchanged with each other. In the embodiment shown in FIG. 4, the optical filter is arranged between the optical lens system and the color separation system, but it may be provided in front of the lens system or within the lens system. Moreover, three sets of optical filters may be arranged between the color separation system and respective solid state image sensors. It should be further noted that there may be arranged a single solid state image sensor instead of the three solid state image sensors. Then a stripe or mosaic color filter is provided on the solid state image sensor. Further, it is not always necessary to set the separation width of the first and third quartz plates to $\frac{1}{3}P_x$ in a precise manner, but may be set to about $\frac{2}{3}P_x$. In such a case, it is possible to attain substantially the same operational function.

In the solid state image pick-up apparatus according to the invention, the amount of suppression in the base band can be reduced as much as possible, while the suppression near the sampling frequency $f_s$ is superior to that of the known apparatus. Moreover, the suppression at $2f_s$, $3f_s$, $4f_s$ and $5f_s$ can be made sufficiently high. Particularly, the suppression at $4f_s$ can be improved materially as compared with the known optical filter. Further the number of quartz plates can be reduced to a number less than that of the optical filter disclosed in Japanese Patent Application No. 63-160849.

What is claimed is:

1. A solid state image pick-up apparatus comprising image sensing means including at least one solid state image sensor having a number of light receiving elements arranged in matrix in main- and sub-scanning directions which are perpendicular to each other;

an optical image forming means for forming an optical image of an object to be picked-up and making said optical image incident upon said solid state image sensor; and optical filtering means for forming trap points and trap lines, including at least one optical filter having at least three quartz plates, the thickness and composition of said optical filter producing trap points at a sampling frequency and near a frequency equal to one and a half times the sampling frequency, no trap point being formed in a frequency range below the sampling frequency, and at said trap point near the frequency equal to one and a half times the sampling frequency, two of said trap lines cross each other at right angles.

2. An apparatus according to claim 1, wherein said optical filter comprises a first quartz plate for separating ordinary and extraordinary light rays from each other in a direction which makes an angle of substantially +45° with respect to the main-scanning direction, a second quartz plate for separating the ordinary and extraordinary light rays from each other in a direction substantially parallel with the main-scanning direction, and a third quartz plate for separating the ordinary and extraordinary light rays from each other in a direction which makes an angle of substantially −45° with respect to the main-scanning direction, wherein:

said second quartz plate is arranged between the first and third quartz plates, said quartz plates being of a thickness and composition such that a ray separation width of the first and third quartz plates viewed in the main-scanning direction is set to substantially a third of a pixel distance between successive pixels of the solid state image sensor arranged in the main-scanning direction and a ray separation width of the second quartz plate viewed in the main-scanning direction is set to substantially a half of said pixel distance.

3. An apparatus according to claim 2, wherein said first, second and third quartz plates are arranged in ascending order when viewed in a direction into which the optical image is made incident upon the optical filter.

4. An apparatus according to claim 2, wherein said third, second and first quartz plates are arranged in descending order when viewed in a direction into which the optical image is made incident upon the optical filter.

5. An apparatus according to claim 1, wherein said image forming means comprises a lens system for forming the optical image and a color separating system for separating the optical image into green, red and blue color images, said image sensing means comprises first, second and third solid state image sensors which are arranged to receive said green, red and blue color images, respectively, and said optical filter is arranged between the lens system and the color separating system.

6. An apparatus according to claim 5, wherein light receiving aperture positions of the first solid state image sensor are shifted by a half of a pixel distance between successive pixels at least in the main-scanning direction with respect to light receiving aperture positions of the second and third solid state image sensors.

7. An apparatus according to claim 2, wherein said optical filter further comprises at least one additional quartz plate for separating ordinary and extraordinary light rays in the sub-scanning direction.

* * * * *